United States Patent
Sethia et al.

(10) Patent No.: US 12,506,770 B2
(45) Date of Patent: Dec. 23, 2025

(54) MONITORING AND PREVENTING SPOOFING, TAMPERING, AND DENIAL OF SERVICE ATTACKS ON CLOUD CONTAINERS

(71) Applicant: Bank of America Corporation, Charlotte, NC (US)

(72) Inventors: Maneesh Sethia, Telangana (IN); Manimaran Sundaravel, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 197 days.

(21) Appl. No.: 18/230,897

(22) Filed: Aug. 7, 2023

(65) Prior Publication Data

US 2025/0055877 A1 Feb. 13, 2025

(51) Int. Cl.
*G06F 21/57* (2013.01)
*H04L 9/40* (2022.01)
*H04L 67/10* (2022.01)

(52) U.S. Cl.
CPC ...... *H04L 63/1441* (2013.01); *H04L 63/1408* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,346,057 B2 | 3/2008 | Foschiano et al. | |
| 2009/0322586 A1 | 12/2009 | Lanzkron | |
| 2017/0063909 A1* | 3/2017 | Muddu | G06F 3/0484 |
| 2018/0089001 A1 | 3/2018 | Smith et al. | |
| 2018/0329757 A1 | 11/2018 | Patgar et al. | |
| 2020/0057663 A1 | 2/2020 | Abbott et al. | |
| 2020/0314013 A1 | 10/2020 | Yin et al. | |
| 2021/0357238 A1 | 11/2021 | Kirmse et al. | |

(Continued)

FOREIGN PATENT DOCUMENTS

CN 110601913 A 12/2019

OTHER PUBLICATIONS

"Red Hat Bugzilla" https://bugzilla.redhat.com/show_bug.cgi?id=1844447, website visited Aug. 7, 2023, pp. 1-11.

(Continued)

*Primary Examiner* — Christopher B Robinson
(74) *Attorney, Agent, or Firm* — Banner & Witcoff, Ltd.

(57) ABSTRACT

A computing platform may train, using historical threat detection information, a threat detection model, which may configure the threat detection model to detect container threats for a plurality of containers deployed at a plurality of nodes on a cloud network. The computing platform may obtain, from a node monitoring system, operating conditions of the plurality of nodes. The computing platform may input, into the threat detection model, the operating conditions of the plurality of nodes, which may cause the threat detection model to identify a threat to at least one container deployed at the plurality of nodes. The computing platform may execute, based on identification of the threat, a security action to protect the at least one container. The computing platform may update, based on the operating conditions of the plurality of nodes and the threat, the threat detection model.

20 Claims, 10 Drawing Sheets

(56) References Cited

U.S. PATENT DOCUMENTS

| | | |
|---|---|---|
| 2021/0390448 A1 | 12/2021 | Krishnamoorthy |
| 2022/0004645 A1* | 1/2022 | Agarwwal .............. H04L 63/20 |
| 2022/0014963 A1 | 1/2022 | Yeh et al. |
| 2022/0021523 A1 | 1/2022 | Klein et al. |
| 2022/0121470 A1* | 4/2022 | Saxena ................... H04L 63/20 |
| 2022/0188700 A1* | 6/2022 | Khavronin ......... G06Q 30/0201 |
| 2022/0365820 A1 | 11/2022 | Jiang et al. |
| 2023/0007038 A1* | 1/2023 | Grounds ................ G06N 20/00 |
| 2023/0142516 A1 | 5/2023 | Broumandan et al. |
| 2023/0146079 A1 | 5/2023 | Jeng et al. |
| 2023/0164158 A1* | 5/2023 | Fellows .............. H04L 41/0654 726/23 |
| 2023/0184926 A1 | 6/2023 | Owechko et al. |
| 2023/0184928 A1 | 6/2023 | Owechko et al. |
| 2023/0188565 A1 | 6/2023 | Lin et al. |
| 2023/0202522 A1 | 6/2023 | Cui et al. |
| 2023/0206698 A1 | 6/2023 | Huang et al. |
| 2023/0206925 A1 | 6/2023 | Havdan et al. |
| 2023/0247430 A1 | 8/2023 | Mohan Raj et al. |
| 2023/0328075 A1* | 10/2023 | Almasan ............. H04L 63/1416 |
| 2023/0370491 A1 | 11/2023 | Crabtree et al. |
| 2024/0031380 A1* | 1/2024 | Lal ...................... H04L 63/1458 |

OTHER PUBLICATIONS

"Red Hat Customer Portal" https://access.redhat.com/discussions/4713291, website visited Aug. 7, 2023, pp. 1-12.
Jun. 18, 2025—(US) Office Action—U.S. Appl. No. 18/230,839.

\* cited by examiner

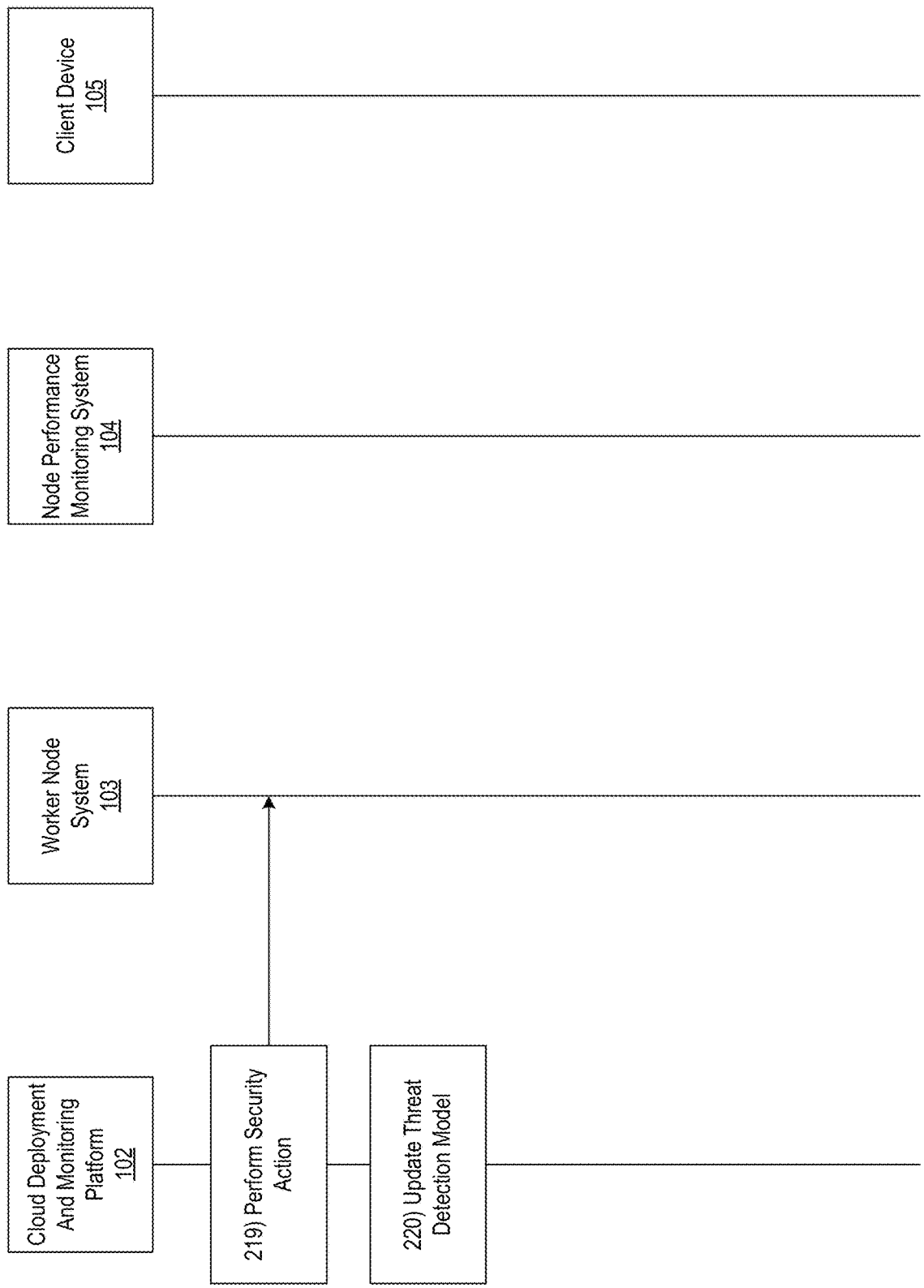

305

Resource Requirement Notification

|        | CPU | Mem | Net | Disk |
|--------|-----|-----|-----|------|
| Node 1 |     |     |     |      |
| Node 2 |     |     |     |      |
| Node 3 |     |     |     |      |
| Pod    |     |     |     |      |

Environment State Notification

|        | CPU | Mem | Net | Disk |
|--------|-----|-----|-----|------|
| Node 1 |     |     |     |      |
| Node 2 |     |     |     |      |
| Node 3 |     |     |     |      |

Pod

FIG. 4

MONITORING AND PREVENTING SPOOFING, TAMPERING, AND DENIAL OF SERVICE ATTACKS ON CLOUD CONTAINERS

BACKGROUND

Aspects of the disclosure relate to computer hardware and software for cloud containers. In some instances, cloud container orchestration may be used to manage and schedule resources of microservices in cloud-native distributed applications. This may, in some instances, cause resource fragmentation, decrease resource utilization (e.g., in terms of computer processing units (CPU), memory, networks, disk, or the like). Accordingly, it may be important to more effectively deploy applications to cloud resources.

In some instances, however, such cloud resources may be vulnerable to attacks, such as spoofing, tampering, denial of service, or the like. This may result in the unauthorized access of application information and/or other security concerns. Accordingly, it may be important to provide improved security and threat detection measures for such cloud resources.

SUMMARY

Aspects of the disclosure provide effective, efficient, scalable, and convenient technical solutions that address and overcome the technical problems associated with cloud container applications. In one or more instances, a computing platform having at least one processor, a communication interface, and memory may train, using historical threat detection information, a threat detection model, which may configure the threat detection model to detect container threats for a plurality of containers deployed at a plurality of nodes on a cloud network. The computing platform may obtain, from a node monitoring system, operating conditions of the plurality of nodes. The computing platform may input, into the threat detection model, the operating conditions of the plurality of nodes, which may cause the threat detection model to identify a threat to at least one container deployed at the plurality of nodes. The computing platform may execute, based on identification of the threat, a security action to protect the at least one container. The computing platform may update, based on the operating conditions of the plurality of nodes and the threat, the threat detection model.

In one or more instances, the threat detection model may be a deep reinforcement learning model. In one or more instances, executing the security action may include: identifying, using a node selection model, an alternative node to which the at least one container may be deployed, and modifying deployment of the at least one container to shift the at least one container from a first node, corresponding to the threat, to a second node. In one or more instances, executing the security action may include: 1) sending, to a user device, a graphical representation of the operating conditions for the plurality of nodes, where each operating condition for each node may be represented by an intersection of a node row and an operating condition column, and 2) sending, to the user device, one or more commands to display the graphical representation, which may cause the user device to display the graphical representation.

In one or more examples, darker shading of the intersection may indicate less availability for the corresponding operating condition for the corresponding node and lighter shading of the intersection may indicate greater availability for the corresponding operating condition for the corresponding node. In one or more examples, the threat may be one or more of: a spoofing attack, a tampering attack, or a denial of service attack.

In one or more instances, training the threat detection model may include setting, for each of the operating conditions, a threat threshold, and identifying the threat may include identifying that at least one of the operating conditions exceeds a corresponding threat threshold. In one or more instances, training the threat detection model may include generating correlations between historical operating condition patterns and known threats, and identifying the threat may include identifying that a current pattern of the operating conditions matches one of the historical operating condition patterns.

In one or more examples, the at least one container may correspond to an application that was deployed to a node of the plurality of nodes, and the node may have been selected using a node selection model. In one or more examples, the node selection model may be trained using historical node performance information and historical application parameter information, and training the node selection model may configure the node selection model to select nodes for application cloud deployment.

In one or more instances, the historical node performance information may include one or more of: computer processing unit (CPU) usage, memory usage, available network bandwidth, or available disk capacity. In one or more instances, the historical application parameter information may include one or more of: computer processing unit (CPU) availability requirements, memory requirements, network bandwidth availability requirements, or available disk capacity requirements.

In one or more examples, the application may have been deployed to the node based on receiving a request to deploy the application to the cloud network. In one or more examples, the request to deploy the application to the cloud network may include a request to containerize the application.

In one or more instances, deploying the application may include: 1) inputting, into the node selection model, parameters of the application and operating conditions of a plurality of nodes of the cloud network, which may cause the node selection model to output a node, of the plurality of nodes of the cloud network, to which the application should be deployed, 2) queue, along with other applications scheduled for deployment to the plurality of nodes, the application for deployment to the node, and 3) after identifying that the application is first in the queue, deploy the application to the node of the cloud network, which may cause creation, at the node, of the at least one container. In one or more instances, outputting, by the node selection model, the node, may include: 1) identifying, based on the parameters of the application and the operating conditions of the plurality of nodes, a subset of the plurality of nodes that fails to satisfy processing requirements for the application; and 2) filtering, from the plurality of nodes, the subset of the plurality of nodes, to produce a filtered plurality of nodes, where selection of the node may include selecting one of the filtered plurality of nodes.

In one or more examples, selecting the node may include: 1) scoring, using the node selection model, each of the filtered plurality of nodes, 2) ranking, based on the scores, the filtered plurality of nodes, and 3) selecting a highest ranked node of the ranked filtered plurality of nodes. In one or more examples, the computing platform may update, based on the parameters of the application, the operating conditions of the plurality of nodes of the cloud network, and the node, the node selection model.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for monitoring and preventing attacks on cloud containers in accordance with one or more example embodiments;

FIGS. 3-4 depict illustrative user interfaces for monitoring and preventing attacks on cloud containers in accordance with one or more example embodiments.

DETAILED DESCRIPTION

Figure 1A:
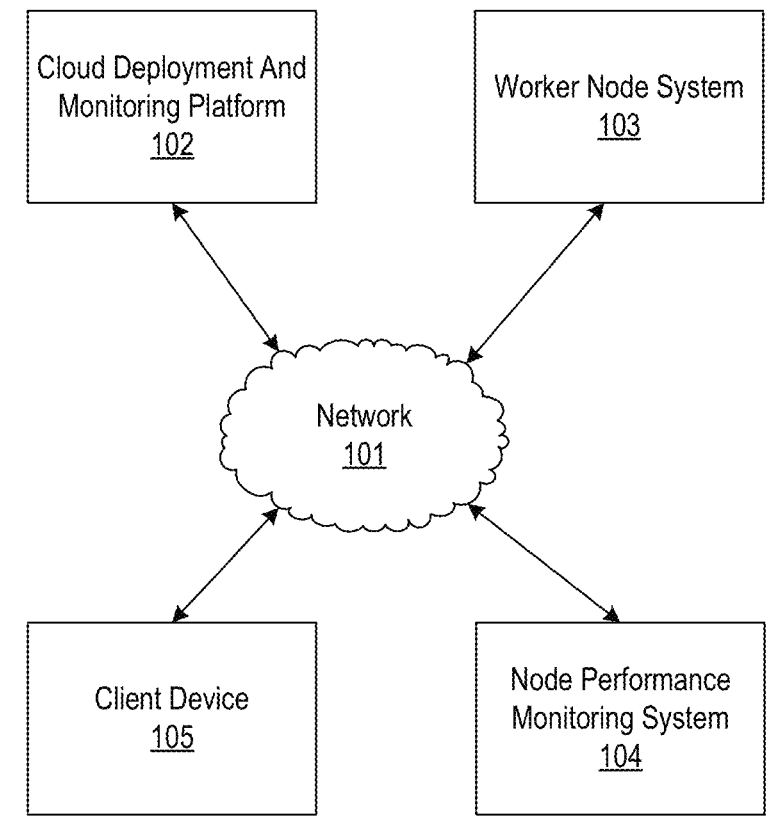
FIGS. 1A-1B depict an illustrative computing environment for monitoring and preventing attacks on cloud containers in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for an intelligent method and apparatus to monitor and prevent spoofing, tampering, denial of service, and/or other attacks on cloud containers are described herein. For example, container orchestration may be used to manage and schedule the resources of microservices in cloud-native distributed applications, and may cause resource fragmentation and decrease resource utilization in terms of CPU, memory, network, and/or desk resources on each node. For example, there may be a limitation of threads, a maximum limit, or the like, which may lead to errors.

Accordingly, described herein is a solution that uses deep reinforcement learning to improve resource utilization in the cloud native distributed container platform. The solution includes monitoring the targeted threats like spoofing, tampering, and/or denial of service by using an anomaly based strategy, and then identifying the unused threats to eliminate/store for a given pod (e.g., a collection of nodes), and then use effective resource utilization. To identify the daemon threads to eliminate, the technique may use an artificial intelligence (AI) deep reinforcement learning network.

The user may specify an image file and resource requirements to deploy the application as a pod. The user may submit the request to deploy the pod to a control node. At the first stage of the scheduling cycle, the scheduler on the central node may filter out the nodes with insufficient resources according to the resource requirements of the pod.

The scheduler sends the request to a decision maker at the scoring stage of the scheduling cycle. After receiving the request, the decision maker may send a message to the monitor on the worker nodes to obtain the node resource utilization. The monitor may apply the spoofing, tampering, and denial of service by using analysis strategy deep reinforcement learning for detection strategy as anomaly based.

When receiving the return of all nodes, the decision maker may aggregate and normalize the node status and the pod resource requirement into the environment state vector state. The color of the state may represent the degree of resource dependence. For example, the darker the color, the higher the resource utilization.

Then, the target network of the decision maker may give the action and send it to the scheduler. The scheduler may filter the nodes with the higher score and continue the scheduling cycle. After the pod is bound to the selected node, the microservice may start running.

Threads may be identified by using deep reinforcement learning and monitoring, and the spoofing, tampering, and denial of service threads may be stored in a database. The repository may undergo for ground truth deep learning for the relevant thread sets associated with the spoofing, tampering, and/or denial of service in question. The deep reinforcement learning strategy may validate for false positives, false negatives, true positives, and true negatives to provide a solution to fix those identified threads. These and other features are described in greater detail below.

Figure 1B:
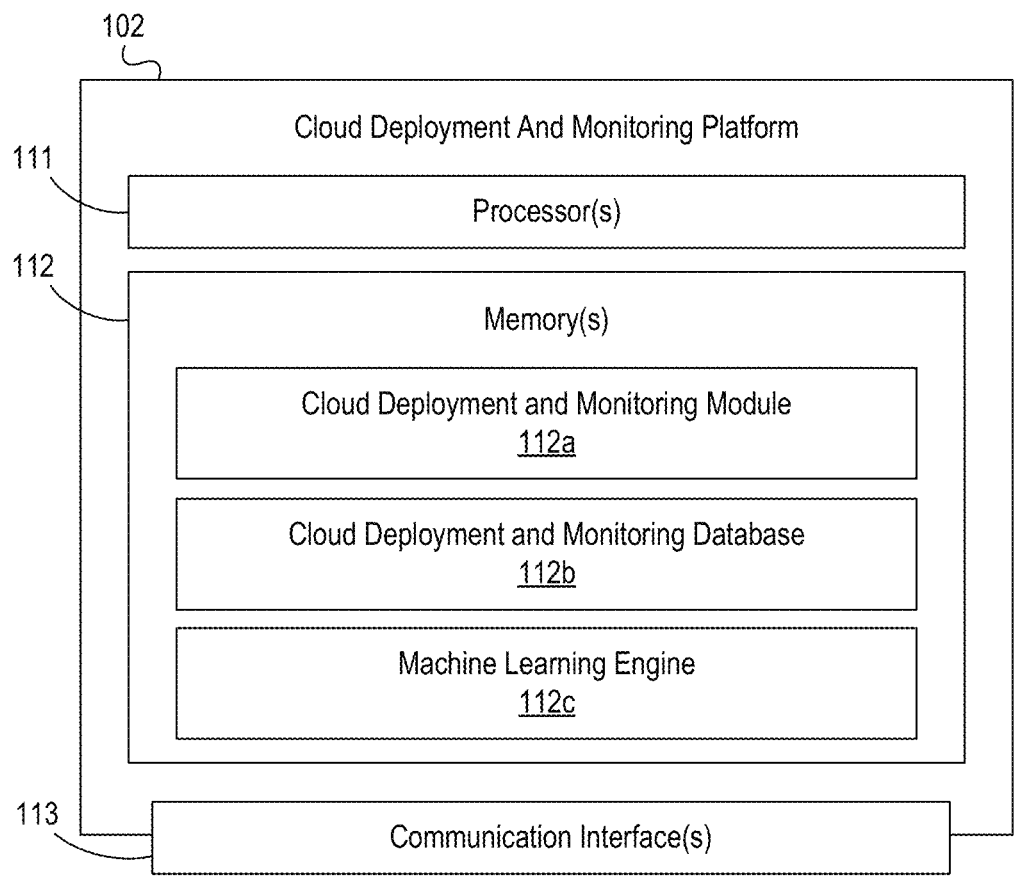

FIGS. 1A-1B depict an illustrative computing environment for monitoring and preventing attacks on cloud containers in accordance with one or more example embodiments. Referring to FIG. 1A, computing environment 100 may include one or more computer systems. For example, computing environment 100 may include a cloud deployment and monitoring platform 102, worker node system 103, node performance monitoring system 104, and client device 105.

As described further below, cloud deployment and monitoring platform 102 may be a computer system that includes one or more computing devices (e.g., servers, server blades, or the like) and/or other computer components (e.g., processors, memories, communication interfaces) that may be used to provide node selection services for the purpose of deploying cloud containers. For example, cloud deployment and monitoring platform 102 may be configured to train, host, and/or otherwise maintain a machine learning engine that may be used to identify an optimal (e.g., in terms of matching processing resources with processing requirements) node at which to deploy an application. In some instances, the cloud deployment and monitoring platform 102 may be further configured to monitor node performance to detect threats. For example, the cloud deployment and monitoring platform 102 may be configured to train, host, and/or otherwise maintain a machine learning engine that may be used to identify threats, and to initiate remediating/security actions accordingly.

Worker node system 103 may be a computer system that includes one or more computing devices (e.g., servers, server blades, or the like) and/or other computer components (e.g., processors, memories, communication interfaces, or the like). The worker node system 103 may be a cloud based system that hosts one or more nodes, which may, e.g., be used to support application containers (e.g., applications deployed to the cloud). In some instances, the worker node system 103 may further maintain one or more pods, which may each correspond to a group of nodes.

Node performance monitoring system 104 may be a computer system that includes one or more computing devices (e.g., servers, server blades, or the like) and/or other computer components (e.g., processors, memories, communication interfaces, or the like). For example, the node performance monitoring system 104 may be configured to monitor processing resources (e.g., CPU, disk space, network availability, available memory, or the like) at the worker node system 103, and may provide this information to the cloud deployment and monitoring platform 102. In some instances, the node performance monitoring system 104 may be integrated into the cloud deployment and monitoring platform 102, whereas in other instances, these may be separate devices/systems.

Client device 105 may be and/or otherwise include a laptop computer, desktop computer, mobile device, tablet, smartphone, and/or other device that may be used by an individual (such as an employee of an enterprise organization). In some instances, client device 105 may be used to initiate an application deployment to the cloud. In some instances, client device 105 may be configured to display one or more user interfaces (e.g., threat alerts, resource requirement notifications, environment state notifications, or the like).

Although a single worker node system 103, node performance monitoring system 104, and client device 105 are shown, any number of such devices may be deployed in the systems/methods described below without departing from the scope of the disclosure.

Computing environment 100 also may include one or more networks, which may interconnect cloud deployment and monitoring platform 102, worker node system 103, node performance monitoring system 104, client device 105, or the like. For example, computing environment 100 may include a network 101 (which may interconnect, e.g., cloud deployment and monitoring platform 102, worker node system 103, node performance monitoring system 104, client device 105, or the like).

In one or more arrangements, cloud deployment and monitoring platform 102, worker node system 103, node performance monitoring system 104, and client device 105 may be any type of computing device capable of sending and/or receiving requests and processing the requests accordingly. For example, cloud deployment and monitoring platform 102, worker node system 103, node performance monitoring system 104, client device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of cloud deployment and monitoring platform 102, worker node system 103, node performance monitoring system 104, and/or client device 105 may, in some instances, be special-purpose computing devices configured to perform specific functions.

Referring to FIG. 1B, cloud deployment and monitoring platform 102 may include one or more processors 111, memory 112, and communication interface 113. A data bus may interconnect processor 111, memory 112, and communication interface 113. Communication interface 113 may be a network interface configured to support communication between cloud deployment and monitoring platform 102 and one or more networks (e.g., network 101, or the like). Memory 112 may include one or more program modules having instructions that when executed by processor 111 cause cloud deployment and monitoring platform 102 to perform one or more functions described herein and/or one or more databases that may store and/or otherwise maintain information which may be used by such program modules and/or processor 111. In some instances, the one or more program modules and/or databases may be stored by and/or maintained in different memory units of cloud deployment and monitoring platform 102 and/or by different computing devices that may form and/or otherwise make up cloud deployment and monitoring platform 102. For example, memory 112 may have, host, store, and/or include cloud deployment and monitoring module 112a, cloud deployment and monitoring database 112b, and/or machine learning engine 112c.

Cloud deployment and monitoring module 112a may have instructions that direct and/or cause cloud deployment and monitoring platform 102 to provide improved cloud based application deployment and monitoring techniques, as discussed in greater detail below. Cloud deployment and monitoring database 112b may store information used by cloud deployment and monitoring module 112a and/or cloud deployment and monitoring platform 102 in application of advanced techniques to provide improved cloud based application deployment and monitoring services, and/or in performing other functions. Machine learning engine 112c may train, host, and/or otherwise refine one or more models that may be used to perform application deployment, threat detection, and/or other functions.

Figure 2A:
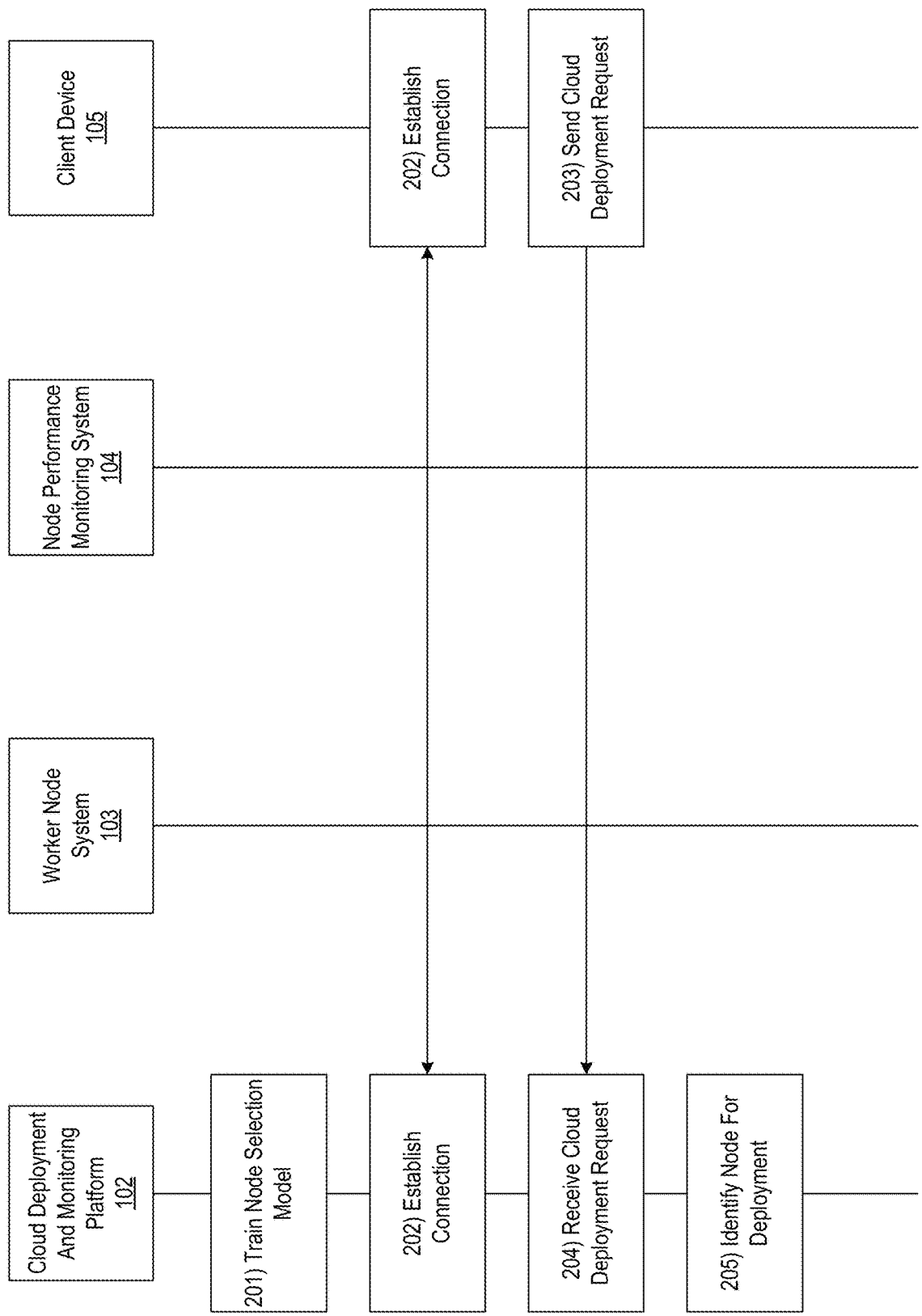

FIGS. 2A-2E depict an illustrative event sequence for monitoring and preventing attacks on cloud containers in accordance with one or more example embodiments. Referring to FIG. 2A, at step 201, the cloud deployment and monitoring platform 102 may train a machine learning model (e.g., a node selection model). For example, the cloud deployment and monitoring platform 102 may train the node selection model to identify a node (e.g., a cloud based node) at which to deploy an application as a container. For example, cloud deployment and monitoring platform 102 may receive historical application deployment information such as application requirements, node performance information, and/or other information. For example, the cloud deployment and monitoring platform 102 may receive information pertaining to CPU usage, memory usage, available network bandwidth, available disk capacity, CPU availability requirements, memory requirements, network bandwidth availability requirements, available disk capacity requirements, and/or other information. The cloud deployment and monitoring platform 102 may input the historical application deployment information into the node selection model to train the node selection model to establish stored correlations between such historical application deployment information and the selected nodes to which the corresponding applications were deployed. In doing so, the cloud deployment and monitoring platform 102 may train the node selection model to identify, based on given application requirements, node performance, and/or other information, a node to which the given application may be deployed.

In some instances, in training the node selection model, the cloud deployment and monitoring platform 102 may set one or more minimum performance thresholds for various application deployment requests (e.g., a minimum CPU, memory, network bandwidth, disk capacity, or the like). In these instances, the node selection model may be trained to first filter out nodes for selection if these minimum performance thresholds are not satisfied.

In some instances, in training the node selection model, the cloud deployment and monitoring platform 102 may train the node selection model to identify a selection score for nodes that were not filtered out based on the minimum performance thresholds (e.g., indicating level of optimization corresponding to use of the corresponding node in performing the deployment). In these instances, the cloud deployment and monitoring platform 102 may be trained to rank this subset of the identified nodes based on their selection scores, and to ultimately output the highest ranked node.

In some instances, in training the node selection model, the cloud deployment and monitoring platform 102 may train a supervised learning model (e.g., decision tree, bagging, boosting, random forest, neural network, linear regression, artificial neural network, support vector unsupervised learning model (e.g., classification, clustering, anomaly detection, feature engineering, feature learning, and/or other unsupervised learning models), and/or other model.

At step 202, the cloud deployment and monitoring platform 102 may establish a connection with the client device 105. For example, the cloud deployment and monitoring platform 102 may establish a first wireless data connection with the client device 105 to link the cloud deployment and monitoring platform 102 with the client device 105 (e.g., in preparation for sending cloud deployment requests). In some instances, the cloud deployment and monitoring platform 102 may identify whether or not a connection is already established between the client device 105 and the cloud deployment and monitoring platform 102. If a connection is already established, the cloud deployment and monitoring platform 102 might not re-establish the connection. Otherwise, if a connection is not yet established, the cloud deployment and monitoring platform 102 may establish the first wireless data connection as described herein.

At step 203, the client device 105 may send a cloud deployment request to the cloud deployment and monitoring platform 102. For example, the client device 105 may send a request to deploy an application to the cloud and/or containerize the application. In these instances, the client device 105 may send the cloud deployment request while the first wireless data connection is established.

At step 204, the cloud deployment and monitoring platform 102 may receive the cloud deployment request sent at step 203. For example, the cloud deployment and monitoring platform 102 may receive the cloud deployment request via the communication interface 113 and while the first wireless data connection is established.

At step 205, the cloud deployment and monitoring platform 102 may identify a node for the requested application deployment. For example, the cloud deployment and monitoring platform 102 may identify a node that may be most optimal for the deployment (e.g., in terms of available processing resources, application resource requirements, or the like). To do so, the cloud deployment and monitoring platform 102 may input current node performance information and application parameter information into the node selection model, which may first identify the corresponding selection thresholds for the application. Once identified, the node selection model may evaluate a plurality of nodes (e.g., hosted at the worker node system 103) to identify any nodes with performance information (e.g., available memory, disk space, CPU, network bandwidth, or the like) that fails any of the thresholds. Any such nodes may be removed from the plurality of nodes by the node selection model, and the remaining subset of the nodes may be scored using the node selection model.

For example, the cloud deployment and monitoring platform 102 may input performance information for the remaining subset of the nodes and the application parameter information into the node selection model to identify selection scores (e.g., where higher scores indicate a better selection choice and lower scores indicate a worst selection choice based on the requirements of the application and the current performance of a given node). For example, a first node with more available memory may be scored higher than a second node with less available memory. The node selection model may then rank the nodes based on their selection scores (e.g., from lowest to highest), and select the node with the highest ranking.

Figure 2B:
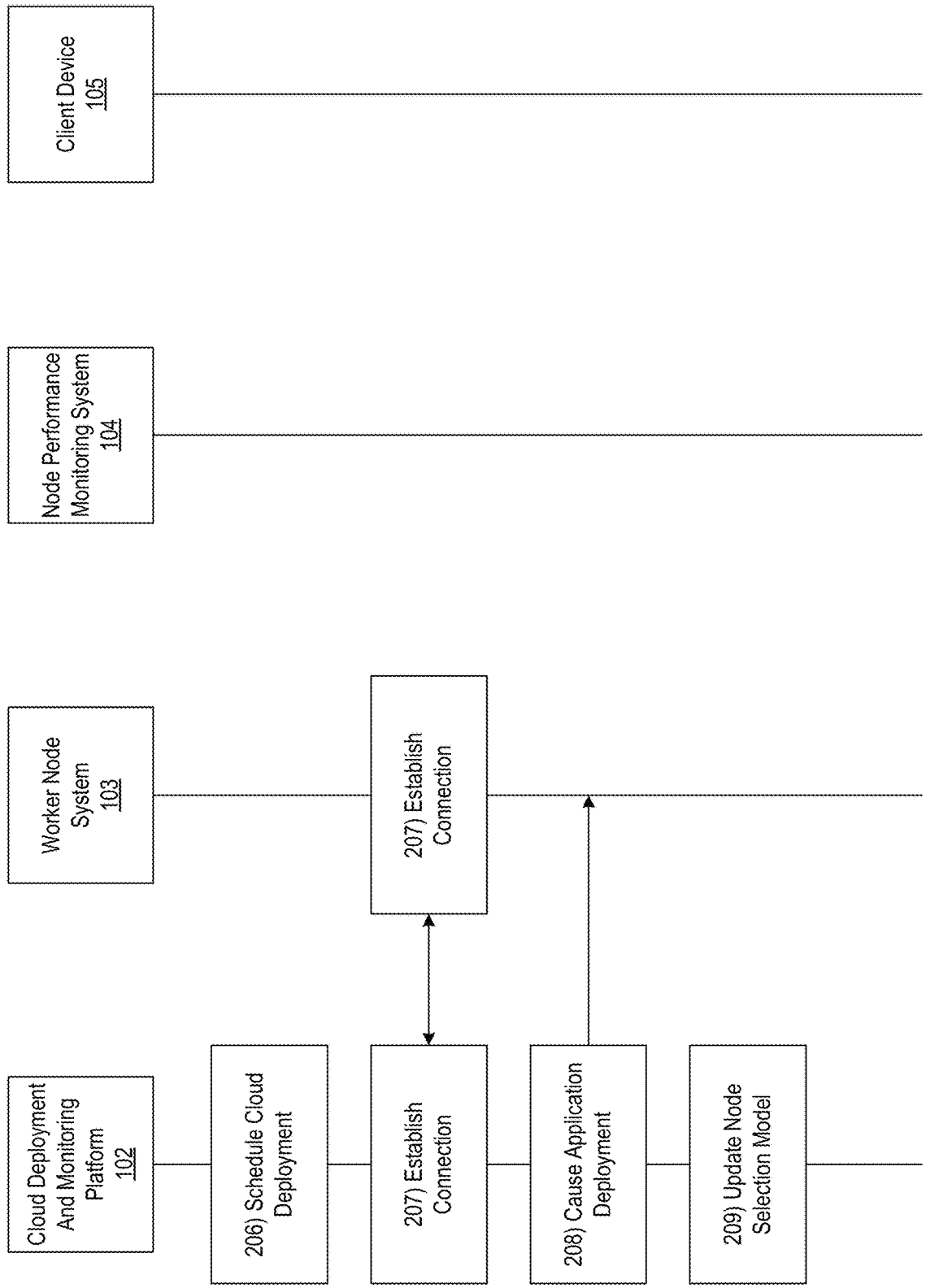

Referring to FIG. 2B, at step 206, the cloud deployment and monitoring platform 102 may schedule cloud deployment of the application to the selected node. For example, the cloud deployment and monitoring platform 102 may add the application to a scheduling queue for deployment. Accordingly, once previously scheduled applications have been deployed to their respective nodes (e.g., and the application is first in line within the queue), the cloud deployment and monitoring platform 102 may proceed to step 207.

At step 207, the cloud deployment and monitoring platform 102 may establish a connection with the worker node system 103. For example, the cloud deployment and monitoring platform 102 may establish a second wireless data connection with the worker node system 103 to link the cloud deployment and monitoring platform 102 (e.g., in preparation for causing deployment of the application). In some instances, the cloud deployment and monitoring platform 102 may identify whether or not a connection is already established with the worker node system 103. If a connection is already established with the worker node system 103, the cloud deployment and monitoring platform 102 might not re-establish the connection. If a connection is not yet established with the worker node system 103, the cloud deployment and monitoring platform 102 may establish the second wireless data connection accordingly.

At step 208, the cloud deployment and monitoring platform 102 may cause deployment of the application to the selected node. In doing so, the cloud deployment and monitoring platform 102 may cause (e.g., via the communication interface 113 and the second wireless data connection) the worker node system 103 to create a container for the application.

At step 209, the cloud deployment and monitoring platform 102 may update the node selection model based on the identified node, the application for which deployment was requested, the node performance information, and/or other information. In doing so, the cloud deployment and monitoring platform 102 may continue to refine the node selection model using a dynamic feedback loop, which may, e.g., increase the accuracy and effectiveness of the model in selecting optimal nodes for application deployment.

For example, the cloud deployment and monitoring platform 102 may use the configuration information, the identified node, the application for which deployment was requested, the node performance information, and/or other information to reinforce, modify, and/or otherwise update the node selection model, thus causing the model to continuously improve (e.g., in terms of node selection).

In some instances, the cloud deployment and monitoring platform 102 may continuously refine the node selection model. In some instances, the cloud deployment and monitoring platform 102 may maintain an accuracy threshold for the node selection model, and may pause refinement (through the dynamic feedback loops) of the model if the corresponding accuracy is identified as greater than the corresponding accuracy threshold. Similarly, if the accuracy fails to be equal or less than the given accuracy threshold, the cloud deployment and monitoring platform 102 may resume refinement of the model through the corresponding dynamic feedback loop.

Figure 2C:
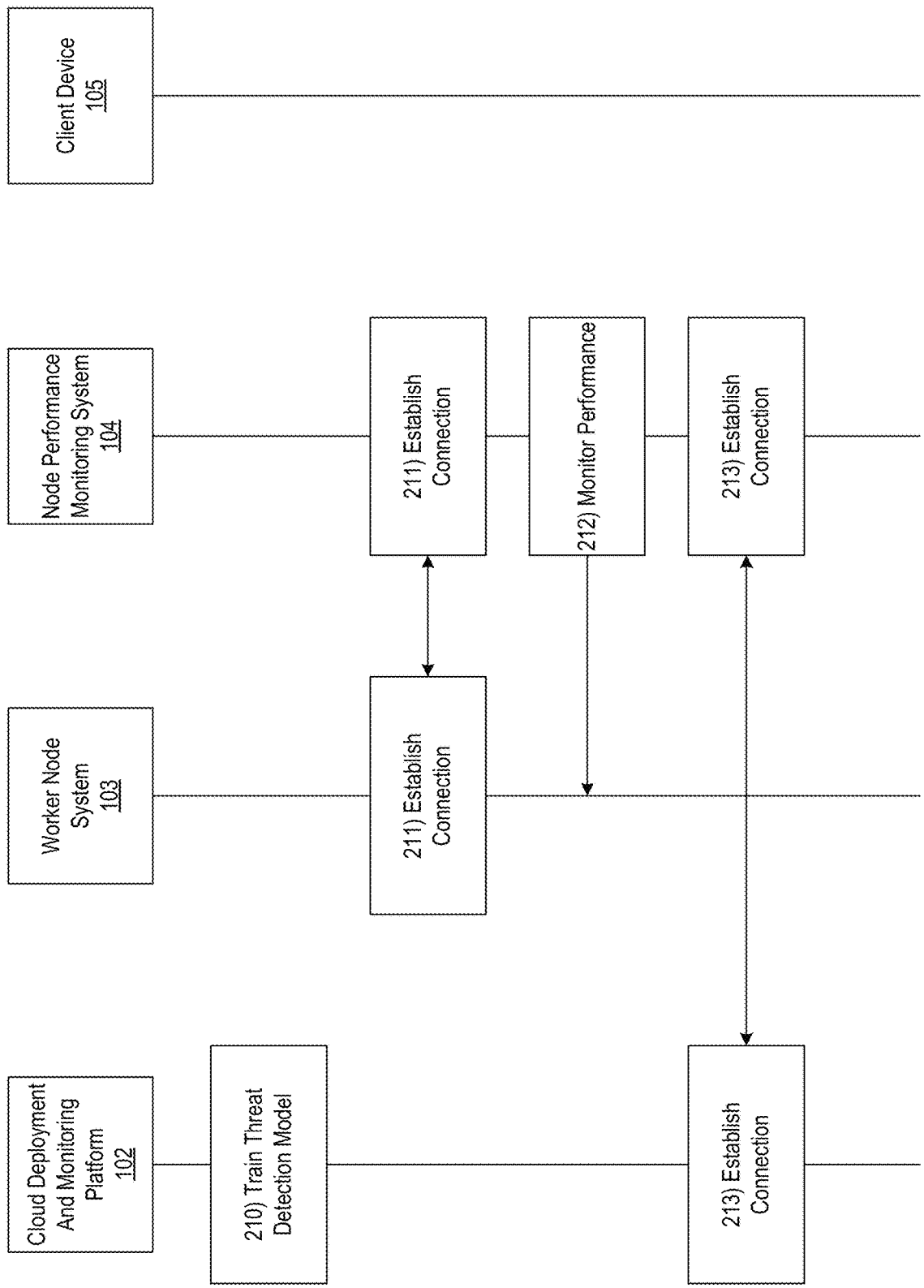

Referring to FIG. 2C, at step 210, the cloud deployment and monitoring platform 102 may train a machine learning model (e.g., a threat detection model). For example, the cloud deployment and monitoring platform 102 may train the threat detection model to identify threats (e.g., spoofing, tampering, denial of service, or the like) at a node (e.g., the node selected at step 205 and/or other nodes). For example, a cloud deployment and monitoring platform 102 may receive historical node performance information, identified threats, and/or other information. For example, the cloud deployment and monitoring platform 102 may receive information pertaining to historical threats and the corresponding CPU usage, memory usage, available network bandwidth, available disk capacity, and/or other information at a node where a corresponding threat was detected. The cloud deployment and monitoring platform 102 may input the historical node performance information, identified threat information, and/or other information into the threat identification model to train the threat identification model to establish stored correlations between such historical threats and the corresponding node performance information. In doing so, the cloud deployment and monitoring platform 102 may train the threat identification model to identify, based on given node performance information, presence of a threat.

In some instances, in training the threat detection model, the cloud deployment and monitoring platform 102 may set one or more maximum performance thresholds for various nodes parameters (e.g., a maximum CPU, memory, network bandwidth, disk capacity, or the like). In these instances, the threat detection model may be trained to identify a threat if any of the node performance information exceeds the corresponding maximum performance thresholds. For example, by detecting a spike in node performance for a given parameter, the threat detection model may identify a threat.

In some instances, in training the threat detection model, the cloud deployment and monitoring platform 102 may train the threat detection model to perform pattern matching across node parameters corresponding to a plurality of different parameters. For example, the cloud deployment and monitoring platform 102 may feed graphical representations similar to graphical representation 305 (as shown in FIG. 3) and/or graphical representation 405 (as shown in FIG. 4). For example, in these instances, parameter columns may intersect with node/pod rows, and the intersections may represent a corresponding level of usage. The darker the intersection, the more usage (e.g., less availability), whereas lighter intersections correspond to less usage (e.g., more availability). For example, a first intersection with a first shading, darker than a second shading of a second intersection, may indicate more availability. In these instances, the threat detection model may be trained to identify the presence of a threat based on identification of a particular performance pattern at a given node.

In some instances, in training the threat detection model, the cloud deployment and monitoring platform 102 may train a supervised learning model (e.g., decision tree, bagging, boosting, random forest, neural network, linear regression, artificial neural network, support vector unsupervised learning model (e.g., classification, clustering, anomaly detection, feature engineering, feature learning, and/or other unsupervised learning models), and/or other model.

At step 211, the worker node system 103 may establish a connection with the node performance monitoring system 104. For example, the worker node system 103 may establish a third wireless data connection with the node performance monitoring system 104 to link the worker node system 103 with the node performance monitoring system 104 (e.g., in preparation for monitoring performance at the worker node system 103). In some instances, the node performance monitoring system 104 may identify whether or not a connection is already established with the worker node system 103. If a connection is already established with the worker node system 103, the node performance monitoring system might not re-establish the connection. If a connection is not yet established with the worker node system 103, the node performance monitoring system 104 may establish the third wireless data connection as described herein.

At step 212, the node performance monitoring system 104 may monitor performance at the worker node system 103. For example, while the third wireless data connection is established, the node performance monitoring system 104 may collect node performance information such as CPU, memory, network bandwidth, disk capacity, or the like for a plurality of nodes/pods. In doing so, the node performance monitoring system 104 may collect information that may be used to generate graphical representations 305 and 405 (and which may, e.g., be generated by the node performance monitoring system 104).

At step 213, the cloud deployment and monitoring platform 102 may establish a connection with the node performance monitoring system 104. For example, the cloud deployment and monitoring platform 102 may establish a fourth wireless data connection with the node performance monitoring system 104 to link the cloud deployment and monitoring platform 102 with the node performance monitoring system 104 (e.g., in preparation for collecting node performance information). In some instances, the cloud deployment and monitoring platform 102 may identify whether or not a connection is already established with the node performance monitoring system 104. If a connection is already established, the cloud deployment and monitoring platform 102 might not re-establish the connection. Otherwise, if a connection is not yet established, the cloud deployment and monitoring platform 102 may establish the fourth wireless data connection as described herein.

Figure 2D:
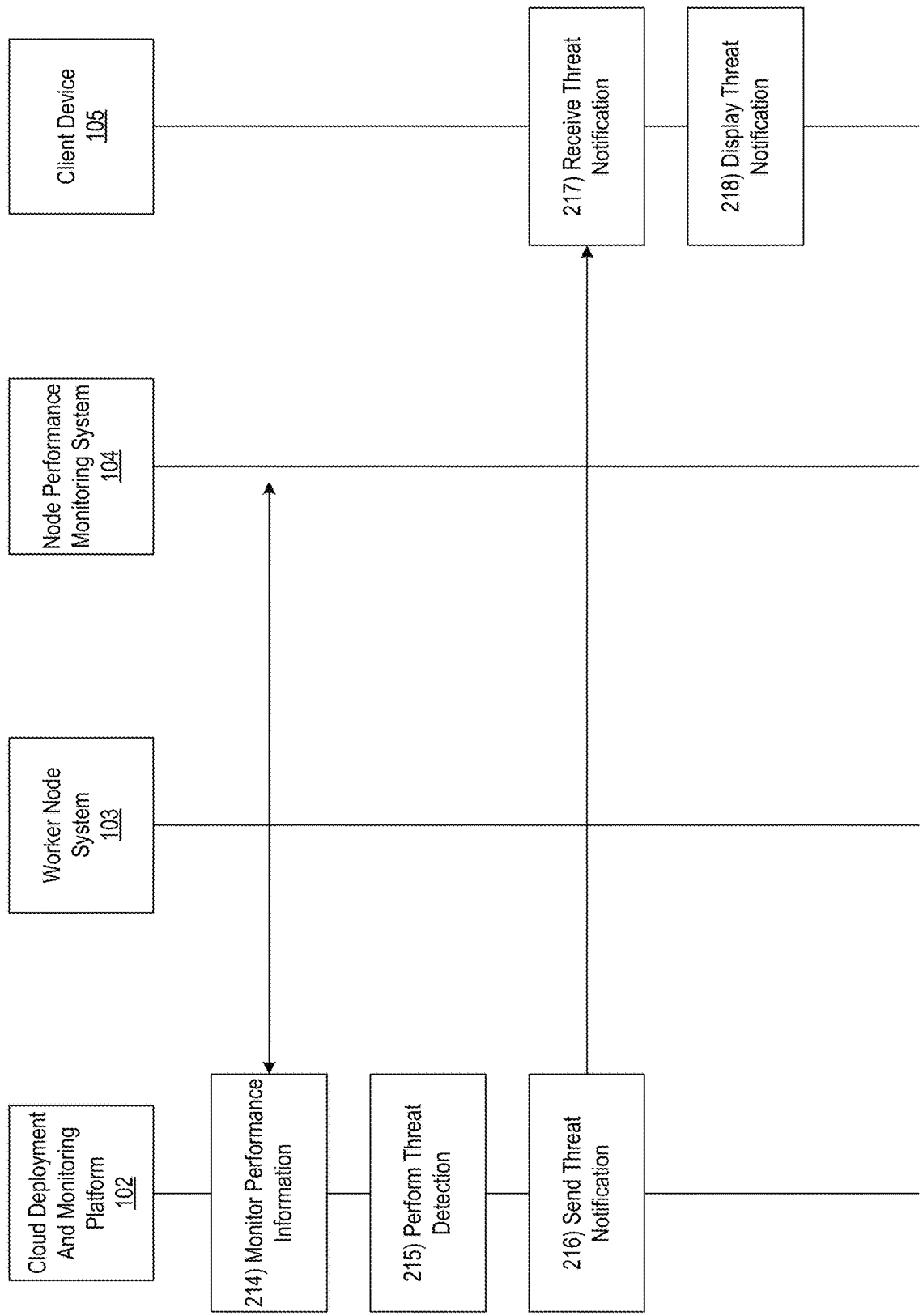

Referring to FIG. 2D, at step 214, the cloud deployment and monitoring platform 102 may monitor the node performance monitoring system 104 to detect the performance information collected at step 212. For example, the cloud deployment and monitoring platform 102 may monitor the node performance monitoring system 104 via the communication interface 113 and while the fourth wireless data connection is established.

At step 215, the cloud deployment and monitoring platform 102 may identify the presence of any threats at the worker node system 103. To do so, the cloud deployment and monitoring platform 102 may input current node performance information (and/or any corresponding graphical representations, such as graphical representations 305 and/or 405) into the threat detection model, which may compare, for each node, the node performance information for each parameter (e.g., CPU, memory, network bandwidth, disk capacity, or the like) to the corresponding maximum performance threshold. If any of the maximum performance thresholds are exceeded, the threat detection model may identify a threat for the corresponding node.

Additionally or alternatively, the threat detection model may compare the graphical representations of the node performance information to stored graphical representations. If a match is identified between the current graphical representation and a stored graphical representation associated with a historical threat, a threat may be identified for the corresponding node. For example, the threat detection model may perform pattern matching across a plurality of parameters, nodes, pods, or the like for the node performance information to identify a threat.

If a threat is not detected, the cloud deployment and monitoring platform 102 may proceed to step 220. If a threat is detected, the cloud deployment and monitoring platform 102 may proceed to step 216.

At step 216, the cloud deployment and monitoring platform 102 may send a threat notification to the client device 105. In some instances, in sending the threat notification, the cloud deployment and monitoring platform 102 may send a graphical representation of the node performance information, which may, e.g., be similar to graphical representation 305 (as shown in FIG. 3), graphical representation 405 (as shown in FIG. 4), and/or other representations. Additionally or alternatively, the cloud deployment and monitoring platform 102 may send an indication of the identified threat (e.g., the affected nodes, the type of threat, a proposed corrective action, and/or other information). In some instances, the cloud deployment and monitoring platform 102 may also send one or more commands directing the client device 105 to display the threat notification. In some instances, the cloud deployment and monitoring platform 102 may send the threat notification to the client device 105 via the communication interface 113 and while the first wireless data connection is established.

At step 217, the client device 105 may receive the threat notification sent at step 216. For example, the client device 105 may receive the threat notification while the first wireless data connection is established. In some instances, the client device 105 may also receive the one or more commands directing the client device 105 to display the threat notification.

At step 218, based on or in response to the one or more commands directing the client device 105 to display the threat notification, the client device 105 may display the threat notification. For example, the client device 105 may display a graphical representation of node performance information corresponding to the identified threat, information of the identified threat, and/or other information.

Referring to FIG. 2E, at step 219, the cloud deployment and monitoring platform 102 may perform an automated security action to address and/or otherwise remediate the threat. For example, the cloud deployment and monitoring platform 102 may feed information of containers deployed at the node associated with the threat back into the node selection model, select a new node for deployment, and deploy the application/container accordingly. Once all applications/containers have been moved from the node associated with the threat, further investigation into the threat may be performed and/or other actions may be taken (e.g., to fortify the node against continued and/or future threats). Once protected, the node may be reopened for future application deployment (e.g., based on selection by the node selection model).

At step 220, the cloud deployment and monitoring platform 102 may update the threat detection model based on the identified threat, the node performance information, and/or other information. In doing so, the cloud deployment and monitoring platform 102 may continue to refine the threat detection model using a dynamic feedback loop, which may, e.g., increase the accuracy and effectiveness of the model in detecting and remediating threats.

For example, the cloud deployment and monitoring platform 102 may use the identified threats, the node performance information, and/or other information to reinforce, modify, and/or otherwise update the threat detection model, thus causing the model to continuously improve (e.g., in terms of threat detection).

In some instances, the cloud deployment and monitoring platform 102 may continuously refine the threat detection model. In some instances, the cloud deployment and monitoring platform 102 may maintain an accuracy threshold for the threat detection model, and may pause refinement (through the dynamic feedback loops) of the model if the corresponding accuracy is identified as greater than the corresponding accuracy threshold. Similarly, if the accuracy fails to be equal or less than the given accuracy threshold, the cloud deployment and monitoring platform 102 may resume refinement of the model through the corresponding dynamic feedback loop.

Figure 5:
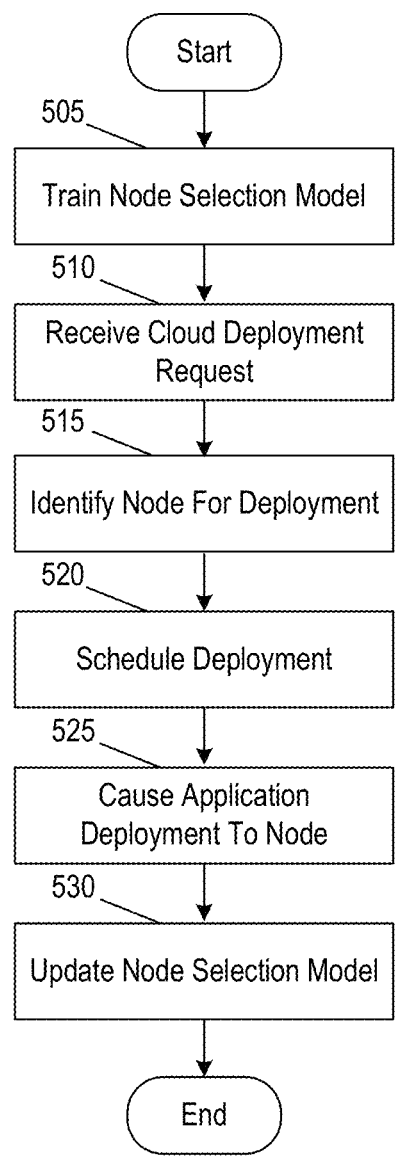
FIGS. 5-6 depict an illustrative methods for monitoring and preventing attacks on cloud containers in accordance with one or more example embodiments.

FIG. 5 depicts an illustrative method for monitoring and preventing attacks on cloud containers in accordance with one or more example embodiments. At step 505, a computing platform having at least one processor, a communication interface, and memory may train a node selection model to select an optimal node for cloud deployment of an application. At step 510, the computing platform may receive a request to deploy an application to the cloud. At step 515, the computing platform may input application parameters and current node performance information into the node selection model to select a node for deployment. At step 520, the computing platform may schedule deployment of the application to the node. At step 525, the computing platform may cause deployment of the application to the node. At step 530, the computing platform may update the node selection model based on the selected node.

Figure 6:
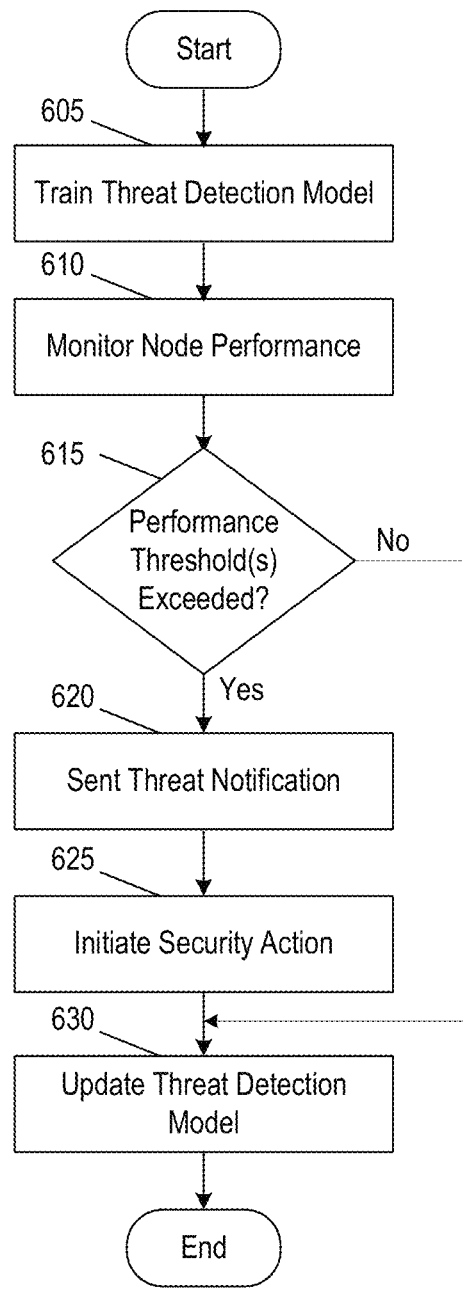

FIG. 6 depicts an illustrative method for monitoring and preventing attacks on cloud containers in accordance with one or more example embodiments. At step 605, a computing platform having at least one processor, a communication interface, and memory may train a threat detection model to identify threats to nodes (e.g., on which applications may be deployed/containerized). At step 610, the computing platform may monitor node performance to detect node performance information. At step 615, the computing platform may input the node performance information into the threat detection model to identify whether or not maximum performance thresholds defined by the threat detection model are exceeded. If no thresholds are exceeded, the computing platform may proceed to step 630. In contrast, if a threshold is exceeded, the computing platform may proceed to step 620.

At step 620, the computing platform may send a threat notification to a client device indicating the threat. At step 625, the computing platform may initiate a security action to address the identified threat. At step 630, the computing platform may update the threat detection model based on the identified threat and the node performance information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   non-transitory memory storing computer-readable instructions that, when executed by the at least one processor, cause the computing platform to:
      train, using historical threat detection information, a threat detection model, wherein training the threat detection model configures the threat detection model to detect container threats for a plurality of containers deployed at a plurality of nodes on a cloud network;
      obtain, from a node monitoring system, operating conditions of the plurality of nodes;
      input, into the threat detection model, the operating conditions of the plurality of nodes, wherein inputting the operating conditions of the plurality of nodes causes the threat detection model to identify a threat to at least one container deployed at the plurality of nodes, and corresponding to an application that was deployed to a node of the plurality of nodes, wherein:
         the node was selected using a node selection model, wherein the node selection model is trained using:
            historical node performance information comprising one or more of: computer processing unit (CPU) usage, memory usage, available network bandwidth, or available disk capacity, and
            historical application parameter information, and wherein training the node selection model configures the node selection model to select nodes for application cloud deployment, and
         deploying the application comprises:
            inputting, into the node selection model, parameters of the application and operating conditions of the plurality of nodes of the cloud network, wherein inputting the parameters and the operating conditions into the node selection model causes the node selection model to output a node, of the plurality of nodes of the cloud network, to which the application should be deployed,
            queueing, along with other applications scheduled for deployment to the plurality of nodes, the application for deployment to the node, and
            after identifying that the application is first in the queue, deploying the application to the node of the cloud network, wherein deploying the application to the node of the cloud network causes creation, at the node, of the at least one container;
      execute, based on identification of the threat, a security action to protect the at least one container; and
      update, based on the operating conditions of the plurality of nodes and the threat, the threat detection model.

2. The computing platform of claim 1, wherein the threat detection model comprises a deep reinforcement learning model.

3. The computing platform of claim 1, wherein executing the security action comprises:
   identifying, using the node selection model, an alternative node to which the at least one container may be deployed; and
   modifying deployment of the at least one container to shift the at least one container from a first node, corresponding to the threat, to a second node.

4. The computing platform of claim 1, wherein executing the security action comprises:
   sending, to a user device, a graphical representation of the operating conditions for the plurality of nodes, wherein each operating condition for each node is represented by an intersection of a node row and an operating condition column; and
sending, to the user device, one or more commands to display the graphical representation, wherein sending the one or more commands to display the graphical representation causes the user device to display the graphical representation.

5. The computing platform of claim 4, wherein darker shading of the intersection indicates less availability for the corresponding operating condition for the corresponding node and lighter shading of the intersection indicates greater availability for the corresponding operating condition for the corresponding node.

6. The computing platform of claim 1, wherein the threat comprises one or more of: a spoofing attack, a tampering attack, or a denial of service attack.

7. The computing platform of claim 1, wherein training the threat detection model comprises setting, for each of the operating conditions, a threat threshold, wherein identifying the threat comprises identifying that at least one of the operating conditions exceeds a corresponding threat threshold.

8. The computing platform of claim 1, wherein training the threat detection model comprises generating correlations between historical operating condition patterns and known threats, wherein identifying the threat comprises identifying that a current pattern of the operating conditions matches one of the historical operating condition patterns.

9. The computing platform of claim 1, wherein the historical application parameter information includes one or more of: computer processing unit (CPU) availability requirements, memory requirements, network bandwidth availability requirements, or available disk capacity requirements.

10. The computing platform of claim 1, wherein the application was deployed to the node based on receiving a request to deploy the application to the cloud network.

11. The computing platform of claim 10, wherein the request to deploy the application to the cloud network comprises a request to containerize the application.

12. The computing platform of claim 1, wherein outputting, by the node selection model, the node, comprises:
identifying, based on the parameters of the application and the operating conditions of the plurality of nodes, a subset of the plurality of nodes that fails to satisfy processing requirements for the application; and
filtering, from the plurality of nodes, the subset of the plurality of nodes, to produce a filtered plurality of nodes, wherein selection of the node comprises selecting one of the filtered plurality of nodes.

13. The computing platform of claim 12, wherein selecting the node comprises:
scoring, using the node selection model, each of the filtered plurality of nodes;
ranking, based on the scores, the filtered plurality of nodes; and
selecting a highest ranked node of the ranked filtered plurality of nodes.

14. The computing platform of claim 1, wherein the non-transitory memory stores additional computer-readable instructions that, when executed by the at least one processor, cause the computing platform to:
update, based on the parameters of the application, the operating conditions of the plurality of nodes of the cloud network, and the node, the node selection model.

15. A method comprising:
at a computing platform comprising at least one processor, a communication interface, and memory:
training, using historical threat detection information, a threat detection model, wherein training the threat detection model configures the threat detection model to detect container threats for a plurality of containers deployed at a plurality of nodes on a cloud network;
obtaining, from a node monitoring system, operating conditions of the plurality of nodes;
inputting, into the threat detection model, the operating conditions of the plurality of nodes, wherein inputting the operating conditions of the plurality of nodes causes the threat detection model to identify a threat to at least one container deployed at the plurality of nodes, and corresponding to an application that was deployed to a node of the plurality of nodes, wherein:
the node was selected using a node selection model, wherein the node selection model is trained using:
historical node performance information comprising one or more of: computer processing unit (CPU) usage, memory usage, available network bandwidth, or available disk capacity, and
historical application parameter information, and
wherein training the node selection model configures the node selection model to select nodes for application cloud deployment, and
deploying the application comprises:
inputting, into the node selection model, parameters of the application and operating conditions of the plurality of nodes of the cloud network, wherein inputting the parameters and the operating conditions into the node selection model causes the node selection model to output a node, of the plurality of nodes of the cloud network, to which the application should be deployed,
queueing, along with other applications scheduled for deployment to the plurality of nodes, the application for deployment to the node, and
after identifying that the application is first in the queue, deploying the application to the node of the cloud network, wherein deploying the application to the node of the cloud network causes creation, at the node, of the at least one container;
executing, based on identification of the threat, a security action to protect the at least one container; and
updating, based on the operating conditions of the plurality of nodes and the threat, the threat detection model.

16. One or more non-transitory computer-readable media storing instructions that, when executed by a computing platform comprising at least one processor, a communication interface, and memory, cause the computing platform to:
train, using historical threat detection information, a threat detection model, wherein training the threat detection model configures the threat detection model to detect container threats for a plurality of containers deployed at a plurality of nodes on a cloud network;
obtain, from a node monitoring system, operating conditions of the plurality of nodes;
input, into the threat detection model, the operating conditions of the plurality of nodes, wherein inputting the operating conditions of the plurality of nodes causes the threat detection model to identify a threat to at least one container deployed at the plurality of nodes, and corresponding to an application that was deployed to a node of the plurality of nodes, wherein:
the node was selected using a node selection model, wherein the node selection model is trained using:
historical node performance information comprising one or more of: computer processing unit (CPU) usage, memory usage, available network bandwidth, or available disk capacity, and
historical application parameter information, and wherein training the node selection model configures the node selection model to select nodes for application cloud deployment, and
deploying the application comprises:
inputting, into the node selection model, parameters of the application and operating conditions of the plurality of nodes of the cloud network, wherein inputting the parameters and the operating conditions into the node selection model causes the node selection model to output a node, of the plurality of nodes of the cloud network, to which the application should be deployed,
queueing, along with other applications scheduled for deployment to the plurality of nodes, the application for deployment to the node, and
after identifying that the application is first in the queue, deploying the application to the node of the cloud network, wherein deploying the application to the node of the cloud network causes creation, at the node, of the at least one container;
execute, based on identification of the threat, a security action to protect the at least one container; and
update, based on the operating conditions of the plurality of nodes and the threat, the threat detection model.

17. The method of claim 15, wherein the threat detection model comprises a deep reinforcement learning model.

18. The method of claim 15, wherein executing the security action comprises:
identifying, using the node selection model, an alternative node to which the at least one container may be deployed; and
modifying deployment of the at least one container to shift the at least one container from a first node, corresponding to the threat, to a second node.

19. The method of claim 15, wherein executing the security action comprises:
sending, to a user device, a graphical representation of the operating conditions for the plurality of nodes, wherein each operating condition for each node is represented by an intersection of a node row and an operating condition column; and
sending, to the user device, one or more commands to display the graphical representation, wherein sending the one or more commands to display the graphical representation causes the user device to display the graphical representation.

20. The method of claim 19, wherein darker shading of the intersection indicates less availability for the corresponding operating condition for the corresponding node and lighter shading of the intersection indicates greater availability for the corresponding operating condition for the corresponding node.

* * * * *